(No Model.) 2 Sheets—Sheet 1.
R. EICKEMEYER.
MEANS FOR OPERATING AND REGULATING SPEED OF ELECTRIC MOTORS.
No. 551,371. Patented Dec. 17, 1895.
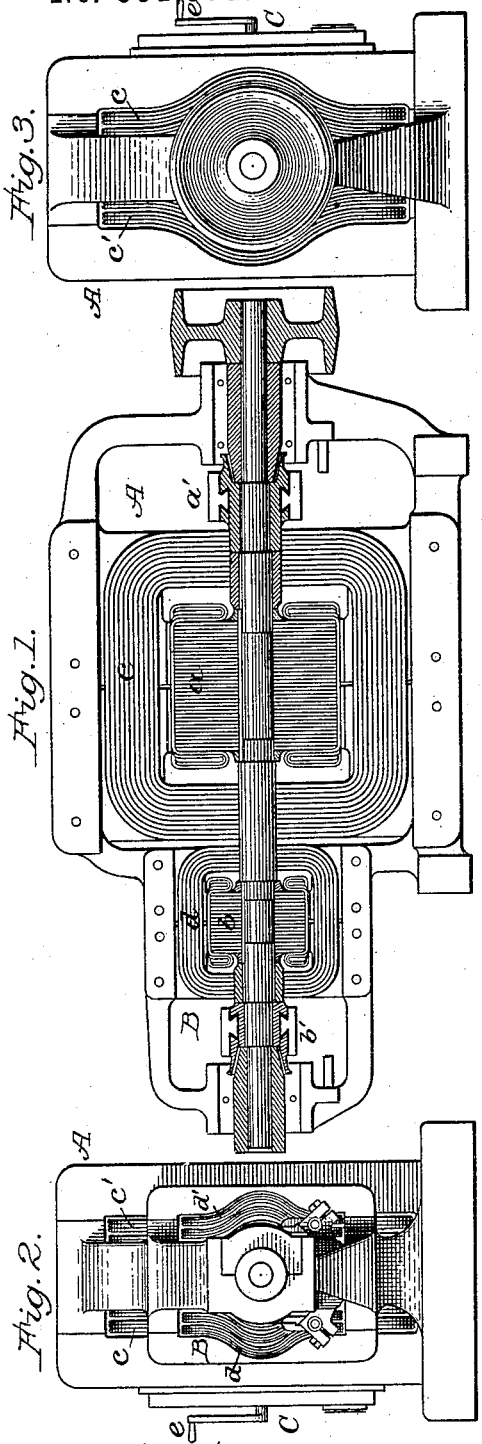
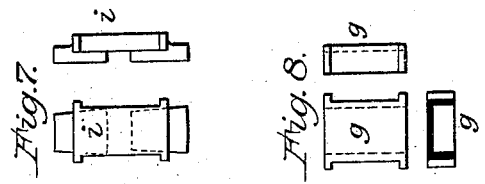
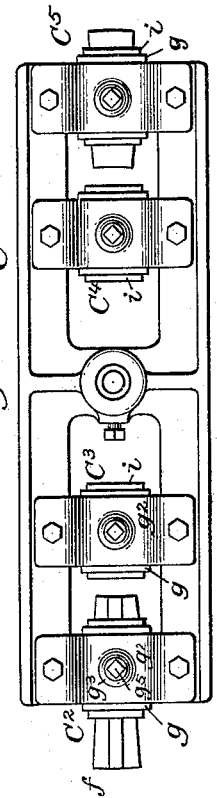
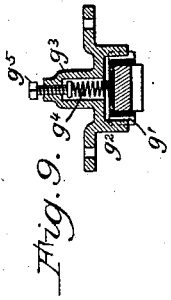
Attest:
Philip F. Larner
Howell Bartle
Inventor:
Rudolf Eickemeyer
By M. C. Wood
Attorney
ANDREW B. GRAHAM, PHOTO-LITHO. WASHINGTON, D.C.

(No Model.) 2 Sheets—Sheet 2.
R. EICKEMEYER.
MEANS FOR OPERATING AND REGULATING SPEED OF ELECTRIC MOTORS.
No. 551,371. Patented Dec. 17, 1895.
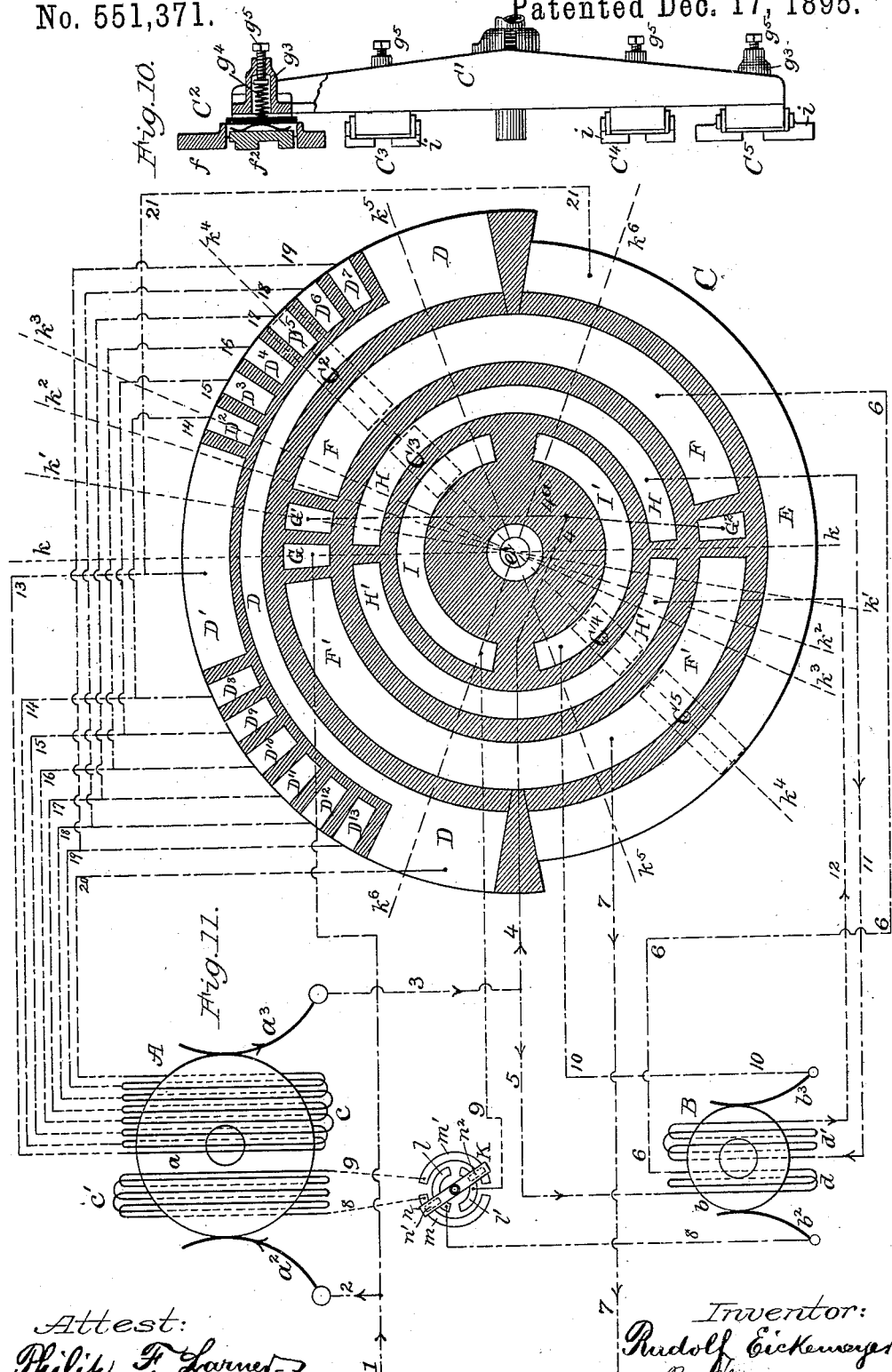
Attest:
Philip F. Larner
Howell Battle
Inventor:
Rudolf Eickemeyer
By M. L. Wood
Attorneys

UNITED STATES PATENT OFFICE.

RUDOLF EICKEMEYER, OF YONKERS, NEW YORK; RUDOLF EICKEMEYER, JR., EXECUTOR OF SAID RUDOLF EICKEMEYER, DECEASED.

MEANS FOR OPERATING AND REGULATING SPEED OF ELECTRIC MOTORS.

SPECIFICATION forming part of Letters Patent No. 551,371, dated December 17, 1895.

Application filed December 31, 1892. Serial No. 456,913. (No model.)

*To all whom it may concern:*

Be it known that I, RUDOLF EICKEMEYER, of Yonkers, in the county of Westchester and State of New York, have invented certain new and useful Means for Operating and Regulating the Speed of Electric Motors; and I do hereby declare that the following specification, taken in connection with the drawings furnished and forming a part of the same, is a clear, true, and complete description of my invention.

My present invention relates to electric-motor organizations, wherein the governing medium is a generating-dynamo driven by the motor, instances of which have been devised by me, and heretofore disclosed with claims appropriate to electric elevators, in my application for Letters Patent, Serial No. 376,740, filed January 5, 1891, and also in my application, Serial No. 407,830, filed February 26, 1892, wherein the claims were not restricted by including any mechanical organization with the electric-motor organization. The organization disclosed in my said application, Serial No. 407,830, involved no reversing capacities, the motor and the governing-dynamo being arranged to operate in one direction only. The electric-elevator organization disclosed in my earlier application, Serial No. 376,740, contained a reversible motor, and in my present application the reversible electric organization is made the subject of claims, which are free from such restrictions as were deemed appropriate to claims founded upon the electric-elevator organization disclosed in my said application. The electric-motor organization to which my present invention pertains is operated and self-regulated, as follows: The field-coils are supplied with an electric current sufficient to drive the motor at its required speed under its maximum load, and the magnetism induced by said field-coils is neutralized in an exact proportion to any increase of speed due to a decrease of load by an independent exciting current generated by power afforded by the motor, as fully set forth in my aforesaid application, Serial No. 407,830. This independent exciting-current is generated by a governing-dynamo, which is driven by the reversible motor in either direction, and my switching mechanism provides for not only controlling the motor circuit but also for appropriately controlling separate divisions of the field in said governing-dynamo, and also controlling its armature-circuit, which includes the governing field-coils in the motor. I have also so organized the governing-dynamo and the governing field-coil in the motor, that the governing-dynamo may be made to reinforce the magnetic field of the motor whenever the normal capacity of the motor proves to be less than occasional emergencies demand.

After describing my invention in detail, in connection with the accompanying drawings, the features deemed novel will be duly specified in the several clauses of the claim hereunto annexed.

Referring to the drawings, Figure 1 illustrates one of my motors with its electric governor in longitudinal vertical central section. Figs. 2 and 3 illustrate the same in two end views. Figs. 4 to 9, inclusive, illustrate the controlling switch-brush in top view and with its brushes in detail. Fig. 10, Sheet 2, illustrates the controlling switch-brush in edge view and partly in section. Fig. 11 illustrates the controlling switchboard in plan view and the several electric connections with the motor and its governing-dynamo, these being shown diagrammatically.

The motor A, Figs. 1, 2 and 3, with its governing-dynamo B are organized in one frame, as disclosed in my aforesaid applications, the motor-armature $a$ and its commutator $a'$ being on an armature-shaft, which also carries the governing-dynamo armature $b$ and its commutator $b'$. The field-coils of the motor, as at $c\ c'$, and of the governing-dynamo, as at $d\ d'$, are arranged in separate divisions or sections, and in each instance they longitudinally surround the armature, as in machines heretofore patented to me; but it is to be understood that my present invention is not restricted to any special type of motor or dynamo, or any special organization of the two machines, provided the dynamo is driven by the motor, and the field-coils of both are in separate divisions or sections, so that in each instance parts thereof may be excited independently of the others. These divisions of the field-coils do not involve any special arrangement with relation to each other, inasmuch as the several divisions may be massed and separated into two portions, so that at their ends they will be equally disposed at the two sides of the armature-shaft, as indicated in Figs. 1, 2 and 3. In machines of other well-known types, the field-coil sections may be massed upon the cores of the field-magnets.

The controlling-switch at C may be located at any desirable position with relation to the motor, but as here shown it is mounted upon the side of the motor and provided with a hand-crank at $e$.

The switch-bar C' is illustrated in Figs. 4 to 10, inclusive. Said bar carries four brushes, one of which, at $C^2$, is provided with two widely-separated but connected contact-faces afforded by a metal block $f$, centrally slotted at $f'$, as shown in top and edge views in Fig. 5. A separate metal block $f^2$, Fig. 6, is backed by a bow-spring and affords two other contact-faces, and a portion of said block occupies the slot $f'$ in the block $f$. These blocks thus coupled are provided with an insulating-shell $g$, Fig. 8, which is loosely fitted into a socket $g'$ in a frame-piece $g^2$, Fig. 9, which is centrally provided with a hollow vertical stem $g^3$, containing a spring $g^4$ and an adjusting-screw $g^5$. The frame-piece $g^2$ is secured upon the switch-bar, which is provided with a sleeve and a crank $e$, and axially mounted on a spindle $e'$. This complex brush or pair of brushes is thus organized, in this instance, so that the two sets of contact-faces may have an independent self-adjusting capacity in electrically coupling an inner switch block or plate, sometimes with one and sometimes with two outer blocks or plates, as will hereinafter be made fully apparent. This combination in a frame-piece of the two brushes controlled by a spring $g^4$, which bears upon the shell $g$ and hence is common to both brushes, constitutes a valuable feature of my invention in connection with a series of switch-plates arranged side by side in three lines, whether either of the lines of plates is a continuous plate or several small plates.

The brushes $C^3$ and $C^4$ are counterparts, and each has but two contact-faces afforded by a block $i$, Fig. 7, provided with an insulating-shell $g$, socket $g'$, in a frame-piece $g^2$, which has a hollow stem $g^3$, a spring, and an adjusting-screw, as before described, these brushes in each instance serving to electrically couple two adjacent switch blocks or plates. The fourth brush $C^5$ differs from these two last described only in having somewhat longer contact-faces. It will be seen that the parts of these brushes can be cheaply constructed and readily assembled, and that they afford high efficiency, but brushes of other forms appropriate to the required duty may be employed without departure from the main features of my invention.

The controlling-switchboard is shown in plan view in Fig. 11, the several plates or blocks being annularly arranged in one plane for co-operation with a switch-arm and brushes of the form described. The upper outer switch-plate D is segmental and nearly semicircular, and it has wide ends connected by a narrow portion, its outer edge being recessed to afford space for a series of small blocks or plates insulated from it and from each other. The middle block D' is longer than the others, and on one side thereof there are six blocks $D^2$, $D^3$, $D^4$, $D^5$, $D^6$, and $D^7$, and on the other side six others $D^8$, $D^9$, $D^{10}$, $D^{11}$, $D^{12}$, and $D^{13}$. The lower outer plate E is also segmental and nearly semicircular, and its ends are separated on a horizontal line from the plate D by insulating material. Within the circle formed by these two plates there are two segmental plates F and F', separated at their ends on a vertical line. Between their upper ends a wide space is occupied by two small plates G and G', insulated from each other, and from the plates F and F', and a third small block $G^2$, similarly insulated, is located between their lower ends. Within the plates F F' there are two more narrow segmental plates H H', separated from each other at their ends on a vertical line, and within these there are two more narrow segmental plates I I', separated from each other at their ends on a horizontal line.

It will be seen that when the switch-bar C is in position the switch-brush $C^2$ will bear upon the plates of the D series, and also upon the inner plates F, F', G, and G', the contact-faces of the brush-block $f$ coupling or connecting the latter plates with the several small outer plates, and the contact-faces of the small brush-block $f^2$ connecting or coupling the plates F, F', G, and G' with the plate D. The switch-brush $C^3$ connects the interior plate I to the next outer plates H H', and the brush $C^4$ in like manner connects said plates to the lower inner plate I', while the brush $C^5$ connects the lower outer plate E to the plates F, F', and $G^2$. In Fig. 11 the motor A, and its governing-dynamo B, are shown diagramatically, with the several electric conductors connecting them with each other and with the switchboard. The entering line-wire 1 communicates with the small switch-plate G, and by shunt at 2 said line-wire connects with a commutator-brush $a^2$ of the motor A. The other commutator-brush $a^3$, by wire 3, connects with and branches at a wire 4 and 5. The wire 4 connects with and branches at a conductor $4^a$ beneath the switchboard, and connects at its ends with the upper small switch-plate G' and the lower small switch-plate $G^2$. The wire 5 (from wire 3) connects with one terminal of a section $d$ of the field-coil in the dynamo-governor B, the other terminal of said section by wire 6 connecting with the switch-plate F, the outgoing line-wire 7 connecting with the switch-plate F'. The governing-dynamo commutator-brush $b^2$ connects by wire 8 with one terminal of the governing field-coil $c'$ of the motor A, its other terminal by wire 9 connecting with the switch-plate I. The wires 8 and 9, which connect with the motor-governing field-coil $c'$, are provided with a reversing-switch, which, and the object thereof, will be hereinafter more fully described. The other brush $b^3$ of the governing-dynamo B connects by wire 10 with the switch-plate I'. The field-coil $d'$ of the governing-dynamo B has its terminals connected with the switch-plates H and H' by wires 11 and 12.

The main field-coil $c$ of the motor A has its several sections or coils in short-circuit connection with the several switch-plates of the D series, as by wires 13 to 20. The wires 13 and 20, being the true terminals of the field-coil, are connected respectively with the switch-plates D' and D. The wires 14 to 19, inclusive, are each branched, so as to be coupled with appropriate oppositely-located switch-plates—as, for instance, wire 14 couples with switch-plates $D^2$ and $D^8$, and wire 15 with plates $D^3$ and $D^9$, and so on throughout the series. The switch-plate D' and wire 13 are connected with the switch-plate E by the wire 21.

When the motor is at rest, the switch-bar C' occupies the vertical dotted line $k$, and then the machine is short-circuited, the current entering on line-wire 1, passing from switch-plate G via brush-block $f$ of the switch-brush $C^2$ to the plate D', thence by wires 13 and 21 to switch-plate E, across on brush $C^5$ to switch-plate F', and out on line-wire 7.

When the switch-bar has been moved so that the inner contact-face of the brush $C^2$ will rest fully on the small switch-plate G', as on line $k'$, the direct communication with the line-wire 1 is cut off, and the supply current then passes from line-wire 1 and wire 2 to the commutator-brush $a^2$ of the motor A, through the armature, out at brush $a^3$ to wire 3, and thence by wire 4 to wire $4^a$ beneath the switch to the plate G', and thence to plate D', wires 13 and 21 to switch-plate E, and thence by switch-brush $C^5$ to plate F' and out on line 7, the motor-armature being then in circuit, and the motor field-coils short-circuited.

When the switch-bar occupies the line $k^2$, with the contact-faces of the block $f$ in the brush $C^2$ lapping from the plates G' to F and also resting on plate D', the current from wire 3 branches so that one portion passes via wires 4 and $4^a$ and the other via wire 5 through the main field-coil $d$ in the governing-motor B, thence on wire 6 to plate F, and from the latter and plate G' to plate D', and thence via wires 13 and 21 to plate E across on brush $C^5$ to plate F', and out on line-wire 7, the main field-coils of the motor and of the governing-dynamo B being then in circuit, and the motor field-coils $c$ being still short-circuited.

With the switch-bar occupying the line $k^3$, communication via wires 4 and $4^a$ is wholly cut off, and all the current then passes on wires 3, 5, and 6, plate F to switch-brush $C^2$, thence to the small switch-plate $D^2$, out on wire 14 through one coil or a small portion of the motor main field-coil $c$, back on wire 13 to wire 21 and plate E, and by brush $C^5$ to plate F' and out on line-wire 7, thus exciting a part, but still short-circuiting the remainder of the motor main field-coil $c$, the block $f^2$ of the switch-brush $C^2$ connecting the plate F with the narrow portion of plate D, with one end of which the motor field-coil terminal wire 20 connects. When the switch-bar occupies the position shown in dotted lines, as on line $k^4$, four of the coils or sections of the motor main field-coil $c$ have been progressively put into circuit, but three are still short-circuited.

The switch-bar when in position on full-speed line $k^5$ puts all of the motor main field-coil sections into circuit, the current from wire 3 then passing via wires 5, governing-dynamo field-coil $d$, wire 6, plate F to one end of plate D via both brush-blocks $f$ and $f^2$ of the switch-brush $C^2$, thence from the opposite end of the plate D via wire 20, through the motor main field-coil $c$, out on wires 13 and 21 to plate E, and thence on brush $C^5$ to plate F' and out on line-wire 7, the motor now being in full operation.

The normal communication between the governing-dynamo B and the governing field-coil $c'$ of the motor A is also controlled by the switch-bar C, and as follows: When the switch-bar stands at line $k$, the brush $c^3$ connects plates H and H' (bridging the space between their upper ends) with each other and with the interior plate I, and the brush $C^4$ in like manner couples plates I' and H H', in which position the governing-dynamo B has its armature and its field-coils short-circuited; but when the switch-bar occupies any of the positions on or between lines $k'$ and $k^5$, the current from the governing-dynamo delivered, say, from its commutator-brush $b^2$, passes via wire 8 through the governing field-coil $c'$ in the motor A, thence on wire 9 to plate I, thence on switch-brush $C^3$ to plate H, thence by wire 11 through the section $d'$ of the field-coils in the governing-dynamo B, thence on wire 12 to plate H' across on brush $C^4$, and thence on wire 10 to the other armature-brush $b^3$ of the governing-dynamo, the current in the governing-coil $c'$ in the motor being normally opposite in direction to that in the main field $c$. In returning the switch-bar to the vertical position, as for stopping the motor, the several changes described will be effected in regular but reversed order.

The several connections described are also appropriately effected when the switch-bar C' is swung from its vertical position with its upper end toward the left hand, for reversing the motor. With the initial opposite movement of the switch-bar, the plate G, which receives current from line-wire 1, is left by the brush $C^2$, thus putting the armature into circuit with the current in the same direction as before, and the brush $C^5$ in passing from the plate $G^2$ to the plate F puts the main field-coil $d$ of the governing-dynamo into circuit and in the same direction as before. When said bar occupies the full-speed position $k^6$, the current then passes through the armature of the motor A, as before, via wires 3, 5, and 6 to plate F, across on the switch-brush $C^5$ to plate E, out on wire 21 to 13, and thence through the motor main field-coil $c$ (opposite to its former direction) to wire 20 and plate D, and thence by switch-brush $C^2$ to plate F', and out on line-wire 7. With this change the current in the field-coil $d$ of the governing-dynamo will not have been reversed, but the governing-dynamo, now being reversely driven, will send a current to the governing field-coil $c'$ in the motor opposite to that first described, and of course opposite to that then flowing in the main field-coil $c$ of the motor. The current generated by the dynamo B now passes from its commutator-brush $b^3$ via wire 10 to plate I', thence to plate H by switch-brush $C^4$, out on wire 11, through the dynamo field-coil section $d'$, thence by wire 12 to plate H', over switch-brush $C^3$ to plate I, thence by wire 9 through the motor-governing coil $c'$ and wire 8 to the other commutator-brush $b^2$ of the governing-dynamo B. It will now be seen that reversals of current are provided for in the coils $c$ and $c'$ of the motor, but none are made in either of the field-coil sections of the governing-dynamo, the current delivered from the governing-dynamo by either of its brushes always passing over the wires 11 and 12 in the one direction, so that the entire field remains the same, the reversal of the armature-current depending upon the opposite rotation of the armature, according to the direction in which the motor-armature is driven. The small switch-plates G' and $G^2$ and the conducting-wires 4 and $4^4$ provide for putting the governing-dynamo field-coil into circuit after the motor-armature has been put into circuit, and this, although a very desirable feature, could be dispensed with, by omitting said plates and wires, and appropriately lengthening the switch-plate F, in which case the motor-armature and the coil $d$ of the governing-dynamo will be simultaneously put into circuit. It will be seen, however, that in stopping the motor with the switch shown, all of the motor field-coil $c$ is progressively short-circuited, while the field-coil $d$ of the governing-dynamo remains fully excited, and therefore whatever current the dynamo might deliver to the governing-coil $c$ will operate with a braking effect upon the motor.

It will be observed that the lesser field-section $d$ of the governing-dynamo B, which is excited by the main current, is intended to initially excite the field of the governing-dynamo to only a slight degree. While the motor A is operating at a desired maximum speed under its maximum load, the governing-dynamo is practically inoperative; but should the load be in whole or in part removed and the motor begin to race the governing-dynamo, under its increased speed, will proportionally have its generating capacity increased, and so reversely excite the governing-coil $c'$ of the motor as to neutralize a sufficient proportion of the magnetism induced by the motor field-coil $c$ and to promptly check the speed of the motor. Although I have shown only the flat annular arrangement of the switch-plates and a swinging brush, it is to be understood that the plates can be organized in flat parallel lines, or in cylindrical or drum form for co-operating with either fixed or with movable brushes without departure from the main features of my invention.

If at any time the motor should require a stronger field, as when working under an extraordinary load, the governing-dynamo may be relied upon for reinforcing duty by causing a reversal of the current in the governing field-coil $c'$ of the motor, so that it can then co-operate with the main field-coil $c$. This is accomplished by means of the special switch K, which has two inner segmental plates $l$ $l'$, respectively connected with the wires 8 and 9, and two outer segmental plates $m$ and $m'$, respectively connected with appropriate terminals of the governing-motor field-coil $c'$. A brush-arm $n$, with brushes $n'$ $n^2$, so couple these plates in pairs that when the dynamo B is operating as a retarding-governor the current will be delivered, say, by wire 8, plate $l$, brush $n'$ to plate $m$, through the governing-coil $c'$, and back through plate $m'$, brush $n^2$, and plate $l'$ to wire 9. By swinging the brush-arm $n$ in the opposite direction, the current will pass from wire 8 to plate $l$, by brush $n'$ to plate $m'$, and thence through the coil back to plate $m$, by brush $n^2$, to plate $l'$, to wire 9, thus sending current in the same direction as that in the motor-coil $c$, and enabling the governing-dynamo to reinforce the motor, and when this duty is no longer needed the switch K can be restored to its normal position and enable the dynamo to resume its normal automatic governing functions. This motor governor-coil-reversing switch K, although here shown remotely from the main switch C, is located upon the casing of the latter, as indicated in Figs. 2 and 3. Inasmuch as the switch K would never be needed until after the switch C had provided for delivering full current to the motor, the switch K and its bar $n$ can be so mounted concentrically with the spindle of the switch-bar C' that the crank of the latter, while passing either of its extreme positions—i. e., beyond line $k^5$ or $k^6$—can be made to operate the switch K.

It will be obvious that the main features of my invention are not dependent upon having the armatures of the motor and dynamo on the same shaft, or even driven in the same direction, so long as the speed of the dynamo depends upon or is graduated to the speed of the motor, and the dynamo connections are such as to enable it to normally deliver its current to the governing field-coil of the motor in a direction opposite to that in the main portion of the motor field-coils. It will be also obvious, if the main-line current should not traverse a portion of the field of the governing-dynamo, that the latter, although then less effective and not so prompt in its action, would nevertheless, although wholly exciting its own field, perform a valuable governing duty, and in such case the connection between wire 3 and switch-plate F would be direct, instead of through the coil $d$ of the dynamo, the switch C then operating, as before described, with respect of the other connections.

Having thus described my invention, I claim as new and desire to secure by Letters Patent—

1. The combination substantially as hereinbefore described, of an electric motor, provided with a governing field coil, a governing dynamo driven by the motor, and a switch for controlling the line current connections with the motor and with the dynamo, and also controlling the delivery of current generated by the dynamo to the governing field coil of the motor.

2. The combination substantially as hereinbefore described, of a reversible electric motor, provided with a governing field coil, a reversible governing dynamo, and a switch which reversibly controls the current supplied to the motor from a main line, and which non reversibly controls all of the current supplied to the field of the dynamo, and which also reversibly controls the current supplied by the dynamo to the governing field coil of the motor.

3. The combination substantially as hereinbefore described, of an electric motor provided with a governing field coil; a governing dynamo provided with field coils in sections, and a switch which controls the connections between the main line and the motor, and also controls the main line current supplied to a portion of the field coils of the governing dynamo, and which still further controls the current generated by said dynamo in its delivery to the governing field coil of the motor.

4. The combination substantially as hereinbefore described, of a reversible electric motor provided with a field coil which is short circuited in sections, by two series of separate annularly arranged switch plates; and a switch bar provided with a brush for a curved switch plate along side of and common to the two series of the separate plates progressively coupling the one plate to either of the two series of separate plates and progressively putting the field coils into service.

5. The combination substantially as hereinbefore described of an electric motor provided with a governing field coil; a governing dynamo provided with field coils in separate sections; and a switch which in position of rest, short circuits the motor and dynamo, and which on being operated, progressively puts the motor armature into circuit with the line, and a section of the dynamo field coil into the same circuit, and then puts the main field coil of the motor into the line circuit, and in the meantime puts the motor governing coil, and the remainder of the dynamo field coil into circuit with the armature of the governing dynamo.

6. The combination of a series of switch plates side by side in three separate lines; a switch bar provided with a brush having contact faces for coupling the two lines of plates at the one side, and having a spring actuated intermediate brush for coupling the middle plate with that at the other side, and a frame piece mounted on the bar, provided with a socket and a spring common to both brushes, for enabling the contact faces of each to adjust themselves to the surfaces of their appropriate switch plates.

7. The combination substantially as hereinbefore described, of an electric motor provided with a governing field coil; a governor dynamo having its armature in circuit with the motor governing coil; and a reversing switch in the dynamo armature circuit for reversing the current in the motor governing coil, and enabling the governor dynamo to operate either for weakening, or for reinforcing the magnetic field of the motor.

RUDOLF EICKEMEYER.

Witnesses:
R. EICKEMEYER, Jr.,
EMIL GARNJOST.